April 29, 1952 B. B. CORK 2,594,732

PREFIRED TRANSMIT-RECEIVE BOX SYSTEM

Filed May 9, 1945 2 SHEETS—SHEET 1

INVENTOR.
BRUCE B. CORK
BY
Ralph L Chappell
ATTORNEY

PREFIRED TRANSMIT-RECEIVE BOX SYSTEM

Filed May 9, 1945 2 SHEETS—SHEET 2

INVENTOR.
BRUCE B. CORK
BY
Ralph L Chappell
ATTORNEY

Patented Apr. 29, 1952

2,594,732

UNITED STATES PATENT OFFICE 2,594,732

PREFIRED TRANSMIT-RECEIVE BOX SYSTEM

Bruce B. Cork, Peck, Mich., assignor, by mesne assignments, to the United States of America as represented by the Secretary of the Navy Application May 9, 1945, Serial No. 592,800

11 Claims. (Cl. 250—13)

This invention relates to a pre-fired spark gap for use in a transmit-receive high frequency radio echo system as a protective switching device, and more particularly to an arrangement of and method of energization of so called "keep-alive" electrodes associated with said gap in order to lower the potential level of the high frequency voltage which will cross the gap.

In order to simplify certain aspects of operation of many radio echo systems, it is expedient to use the same antenna for transmitting and receiving. A switching effect is required to connect and disconnect the transmitter and receiver alternately to this antenna, because if both were connected all the time the receiver would be damaged and blocked by the transmitted pulse of high frequency energy, and also incidentally, the output power to the antenna would be decreased. On the other hand, part of the energy of received echo signals would be diverted to the transmitter, thus reducing the amount going to the receiver.

Because of the different value of impedance presented by most magnetron transmitters between the transmitting and the quiescent state, the diversion of received signals can be prevented without disconnection by proper length of connecting lines or wave guides between the transmitter and the antenna T-junction. To protect the sensitive receiver from the very large high frequency output pulse, however, requires as nearly perfect isolation of the receiver as possible during the pulse. It is necesary that the switch device act within a fraction of a microsecond from the start of the pulse and provide a good, short circuit of the receiver during the pulse.

Commonly used for this short circuiting switch is a gas discharge across a gap which is shunted across the receiver line so that when the pulse occurs the gap will fire and short circuit the line and reflect high impedance back to the T-junction, thus preventing the high potential from reaching the input of the receiver. The amount of voltage then reaching the receiver depends on the voltage across the resistance of the gap. An improvement in protection results when a voltage step up transformer is placed before the gap and a step down transformer after it. This transformer takes the form of a resonant line or in the micro-wave region of the spectrum a cylindrical resonant cavity. This acts as an auto-transformer and has its maximum electric field and maximum voltage at the center where the gap is placed. A much smaller input will then cause firing of the gap, and since the output to the receiver is proportional to the input to the cavity, less voltage gets to the receiver.

Since it requires a higher potential to break down and fire the gap than to maintain the arc during the remainder of the high frequency pulse, anything which reduces the necessary breakdown potential provides an extra degree of protection for the receiver located beyond the gap. One expedient used to decrease the breakdown or "spike" voltage has been to partially evacuate the region of the gap. A further expedient has been to subject the region of the gap to a constant potential difference so that the gas there is constantly ionized to a certain degree.

It is one object of this invention to construct a spark gap having added auxiliary electrodes so energized as to pre-fire the gap and minimize the value of the high frequency potential which will traverse the gap.

It is another object of this invention to so construct and arrange the auxiliary electrodes in a tube used in connection with a spark gap as to reduce or eliminate sputtering of metal particles onto the glass of the tube in the region of the gap.

It is another object of this invention to construct a transmit-receive radio echo system having a pre-fired or pre-pulsed spark gap as a protective switch to enable the use of one antenna both for transmitting and for receiving with a maximum of protection to the receiver during the high frequency transmitted pulse.

Other objects and features will be revealed by consideration of the following detailed description taken with the accompanying drawings, the figures of which represent typical embodiments and are not to be construed as defining or limiting the scope of the invention.

Figures 1, 6:
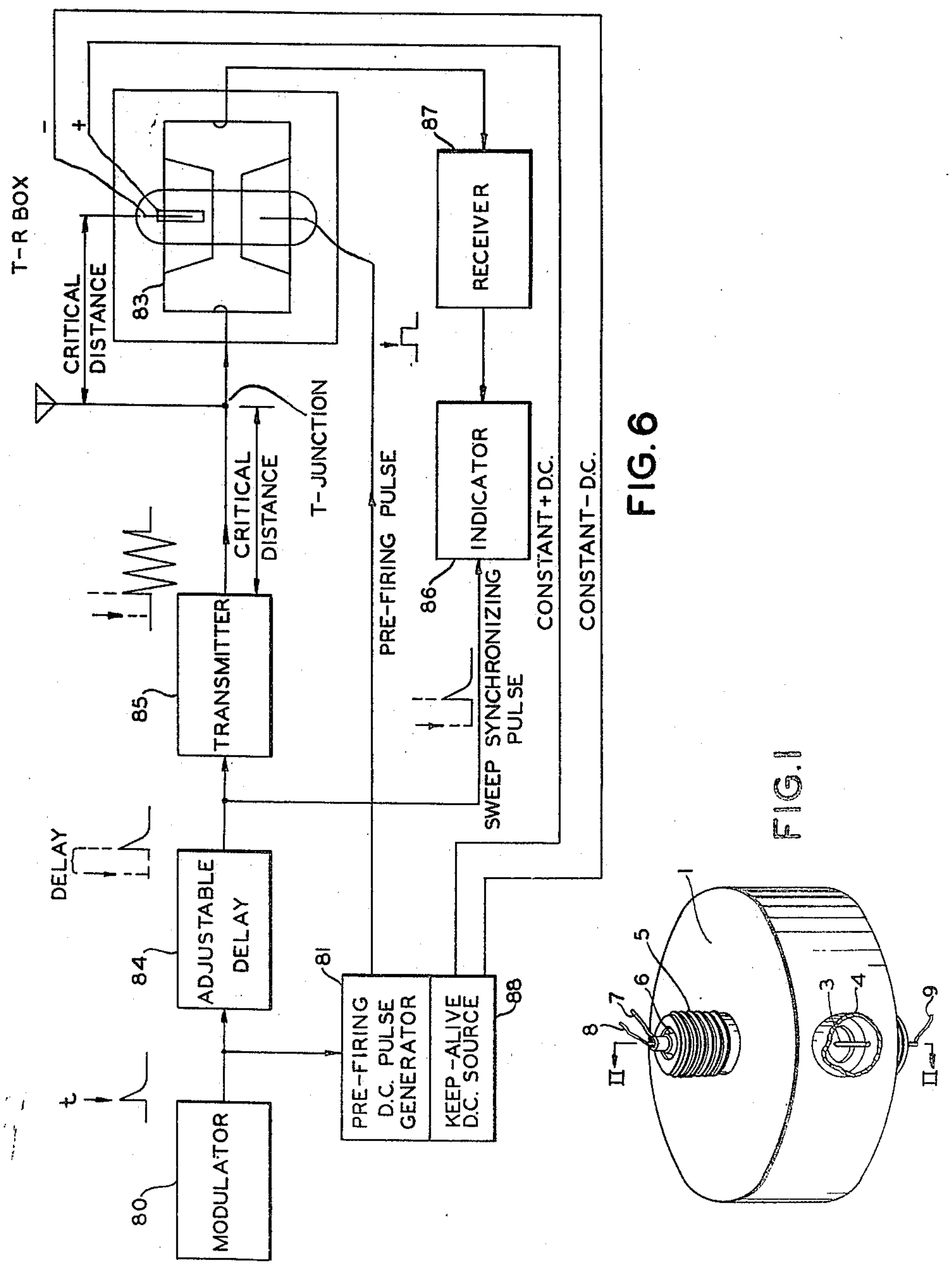
Fig. 1 is a perspective view of one form of the invention.
Fig. 6 is a diagram of a system incorporating the principles of this invention.
Figure 2:
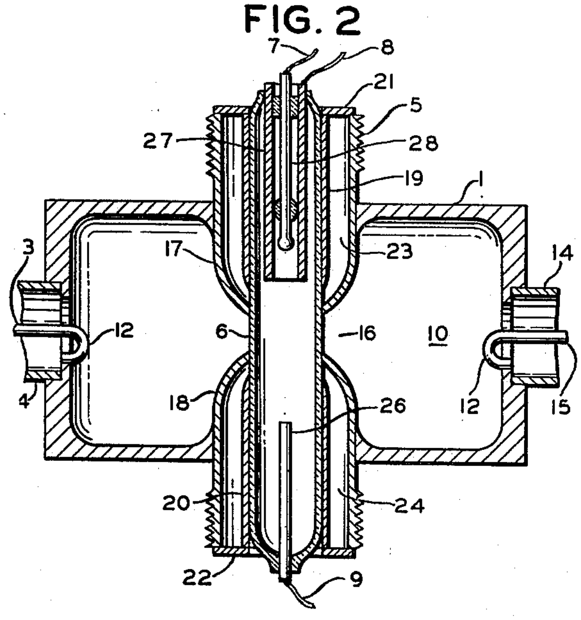
Fig. 2 is a section taken on the line II—II of Fig. 1 showing a resonant cavity with a spark gap between two main radio frequency electrodes and auxiliary electrodes arranged in accordance with the teaching of this invention.

Fig. 1, shows in perspective, and Fig. 2 in section, a typical embodiment of the principle of this invention and shows a cylindrical conducting member 1 enclosing a resonant cavity 10 with a coaxial line 4 having a center conductor 3 projecting into the cavity and turning back in a vertical loop 12 to terminate in the wall of the member 1, thus completing the circuit with the outer conductor 4. Another coaxial line 14, not shown in Fig. 1, having a center conductor 15 is also coupled by another loop 12 to the cavity 10 at a point diametrically opposite the one shown.

Inserted axially through the cavity 10 at the center is a glass tube 6 secured within supporting member 5. Sealed leads 7 and 8 are for connection to a source of potential difference, while sealed lead 9 is for connection to a source of periodically produced relatively high potential. As shown particularly in Fig. 2, the outer conductors of the coaxial lines 4 and 14 as well as the loops 12 of the center conductors 3 and 15 thereof are conductively attached to the wall of member 1.

These coaxial lines 4 and 14 are for connecting the cavity 10 to a receiver, and to the T-junction of a high frequency transmitter and an antenna. Echo signals from the antenna pass into the cavity 10 through one coaxial line and out of the cavity 10 through the other coaxial line to the receiver as diagrammatically shown in Fig. 6 to be described hereafter. This method of coupling is suggestive only and other methods of coupling the cavity 10 are available such as by slits opening the cavity 10 into wave guides to and from the cavity.

A narrow gap 16 is formed between two hollow open-ended conical projections 17 and 18 through which the tube 6 extends, which projections constitute the main radio frequency gap electrodes. Metal tubes 19 and 20 are arranged within and concentric with the conical projections 17 and 18 respectively and with the latter are secured to annular caps 21 and 22. There are produced thereby radio-frequency choke cavities 23 and 24, which are provided in order to prevent the high frequency energy from leaking off into leads 7 and 8, and into lead 9 respectively.

The outer end of tubes 19 and 20 are open to permit the insertion of the glass tube 6 which contains the auxiliary electrodes 26, 27, and 28 sealed in an atmosphere of air or other gases. The electrodes 27 and 28 are suitably insulated from each other. The glass tube 6 should be of quartz or other low dielectric loss glass in order to minimize loss of received echo signal strength by keeping the leakage loss of received signals across the cavity 10 between gap electrodes 17 and 18 at a minimum.

In operation a direct current potential difference, from leads 7 and 8 respectively, is maintained between auxiliary electrodes 27 and 28, the latter being the cathode, causing a slow direct current discharge, and ions resulting from the action of these so-called "keep-alive" electrodes diffuse within the envelope to the region of the main gap 16. Shortly before the occurrence of the radio frequency transmitted pulse, a direct current pulse of relatively high amplitude is applied to electrode 26 from lead 9, causing an intense direct current discharge to take place across the evacuated region within the envelope 6 in the region of the gap 16 just preceding the occurrence of the high frequency transmitted pulse. The intense discharge within the envelope constitutes a low resistance path along which the radio frequency energy can pass in going between the main radio frequency electrodes 17 and 18. Because there is already existing, at the instant when the radio frequency pulse arrives, this direct current arc within the envelope, the magnitude of the radio frequency voltage for the shorting arc is much smaller than would be the case if the ionization and arc within the envelope were not established in advance. The radio frequency current which passes between the electrodes 17 and 18 follows a course from each gap electrode capacitively through the wall of glass tube 6 to the discharge arc within, then along this arc to a point opposite the other gap electrode and again capacitively back through the wall of glass tube 6 to the other gap electrode. Thus although a short circuit is established between gap electrodes 17 and 18, yet the radio frequency arc does not actually touch the gap electrodes 17 and 18.

The electrodes 27 and 28, and also 26 are placed well back from the region of the main radio frequency gap 16 in order to prevent sputtering of metal particles onto the glass envelope 6 near the gap thus maintaining the efficiency of the resonator and prolonging the useful life of the tube 6 and auxiliary electrodes 26, 27, and 28. The outer electrode 27 is extended beyond the center electrode 28 and is positive with respect to it. Since the envelope is separate and removable substitutions can readily be made.

Figure 3:
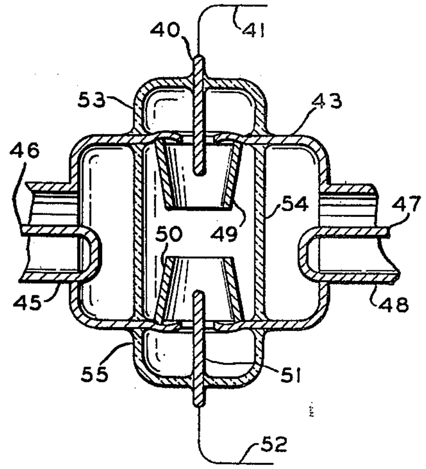
Fig. 3 is a half-sectional view corresponding to Fig. 2 of another arrangement of a gap and auxiliary electrodes.

Referring to Fig. 3, wherein is shown in half-section a simpler form of the invention, the "keep-alive" or ionizing electrode 40 is connected to one side of a positive direct current potential source through lead 41, the other side of such source being connected through a ground connection, not shown, to the conducting cylindrical member 43 and thus indirectly to open ended conical member 49. The cylindrical member 43 encloses a resonant cavity having input and output coupling coaxial lines having conductors 45, 46, 47, and 48.

Located opposite the conical member 49 is a second open ended conical member 50. These two conical members 49 and 50 constitute the radio frequency electrodes between which the radio frequency short circuiting arc passes. A pre-firing electrode 51 is positioned opposite electrode 40 and is connected by lead 52 to a source providing periodically a pulse of relatively high potential. A non-conducting envelope composed of three parts, 53, 54, and 55, permits reduction of pressure and use of other gases than air in the region of the radio frequency gap, and also gives support for auxiliary electrodes 40 and 51.

Ionization is caused by the potential difference existing between electrodes 40 and 49 and ions diffuse toward the gap between the radio frequency electrodes 49 and 50. As described with respect to the structure of Figs. 1 and 2 shortly before the occurrence of the transmitted radio frequency pulse a pre-firing pulse of relatively high magnitude is impressed on electrode 51 by way of lead 52 thus causing an intense discharge across the region of the gap between the radio frequency electrodes 49 and 50. This provides a low resistance ionized path for the radio frequency transmitted pulse to use in traversing the gap between electrodes 49 and 50.

Figure 4:
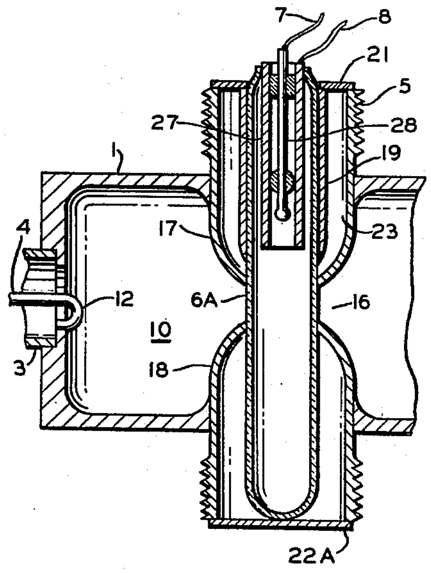
Fig. 4 is a half-sectional view corresponding to Fig. 2 showing an improved arrangement of auxiliary "keep-alive" electrodes.

Fig. 4 is a half-sectional view of the invention in an adaptation not employing the pre-firing pulse but merely establishing ionization in the neighborhood of the gap by diffusion. Fig. 4 is identical with Fig. 2 except that pre-firing electrode 26 and its lead 9 are omitted and also omitted is the tube 20 which in the Fig. 2 represents a part of one radio frequency choke cavity. The cap 22A is solid in this version, and the tube 6 of Fig. 2 is replaced by a tube 6A which is identical with tube 6 except for the omission of the electrode 26 and the tube structure sealing the electrode 26 thereto. Different potentials are applied to the auxiliary electrodes 27 and 28 as before and ionization produced which diffuses to the region of the main radio frequency gap 16 between electrodes 17 and 18. Sputtering of metal onto the envelope 6A near the main radio frequency gap 16 is avoided by extending the cylindrical auxiliary electrode 27 beyond the end of electrode 28 and by positioning both remote from the gap 16, and by impressing electrode 28 negatively with respect to electrode 27.

Figure 5:
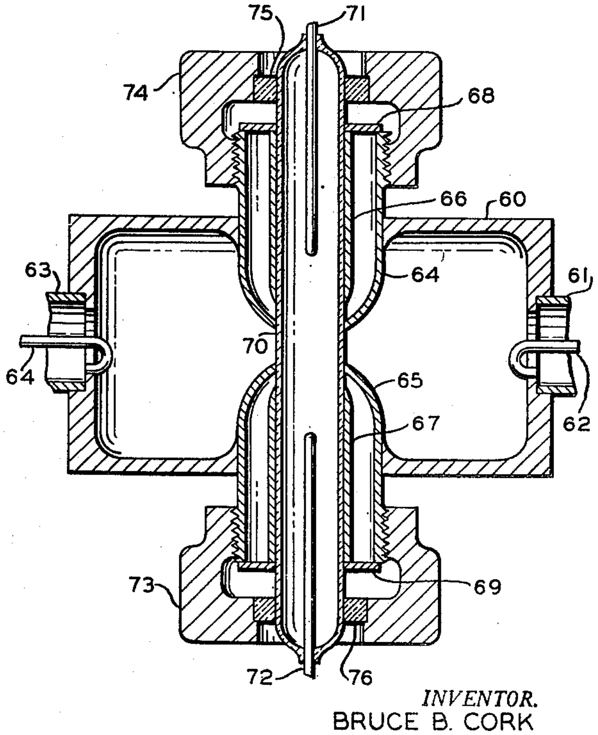
Fig. 5 is a half-sectional view corresponding to Fig. 2 showing another improved arrangement of the auxiliary "keep-alive" electrodes.

Fig. 5 shows a different arrangement of the auxiliary electrodes in the adaptation not employing a pre-firing pulse. Here again, as in the structure of Fig. 2, there is a resonant cavity included within a cylindrical conducting member 60 with input and output coaxial lines with elements 61, 62, 63, and 64. The main radio frequency gap is between conical electrodes 64 and 65. Tubular members 66 and 67 are attached respectively to annular caps 68 and 69 and together with the electrodes 64 and 65 enclose high frequency choke cavities which prevent the high frequency energy from leaking off into the auxiliary electrode potential sources. Through circular openings in the annular caps 68 and 69 is inserted an envelope 70 containing at opposite ends auxiliary electrodes 71 and 72. These are connected to sources of direct current potential causing ionization within the envelope. The location of the tips of these electrodes well back from the region of the radio frequency electrode gap has the effect of reducing or eliminating sputtering of metal on the glass envelope near the gap. Sputtering members 73 and 74 provided with insulating rings 75 and 76 help to position and support the central envelope 70.

Fig. 6 is a block diagram of a high frequency transmit-receive radio echo system employing a prepulsed or pre-fired spark gap of the sort above described as a protective switching device. The system includes a modulator 80 for producing periodically a trigger pulse which is used to initiate a relatively high potential pulse from a generating circuit 81 which pulse is in turn used to pre-fire the spark gap switch 83 in the manner above described. The spark gap 83 is located at an electrically critical distance, for example, an odd number of quarter wave lengths from the T-junction of the line from an antenna leading to both the transmitter 85 and a receiver 87. The original trigger pulse is also fed to an adjustable delay circuit 84 where it is delayed suitably to allow the gap to become fired. Then the delayed trigger is applied to a transmitter 85 and also applied simultaneously to start the sweep of an indicator circuit 86. Since at the instant of transmission the gap is already fired the radio frequency pulse finds at the gap a very low impedance which is reflected back a critical distance to the junction of the antenna line as a high impedance. Thus the receiver 87 is protected from the transmitted pulse. In connection with the operation of the gap is shown also a source 88 of ionizing voltage for the auxiliary electrodes. The transmitter 85 is also placed at an electrically critical distance from the antenna T-junction so that a high impedance to returning echo signals is presented at the T-junction by the line to the transmitter 85, thus preventing diversion of the echo signal. This electrically critical distance may be an even number of electrical quarter wave lengths if the input impedance of the transmitter 85 goes up when it is de-energized or it may be an odd number of electrical quarter wave lengths if the impedance of transmitter 85 goes down when it is de-energized.

Although a certain and specific embodiment of the invention has been shown this is to be deemed exemplary only and the invention is not to be limited except insofar as necessitated by prior art and the spirit of the appended claims.

What is claimed is:

1. A shorting switch for high frequency energy comprising a pair of axially aligned electrodes having a spark gap therebetween, a non-conducting envelope extending axially of said pair of electrodes and across said spark gap, said envelope being filled with rarefied gases, auxiliary ionizing electrodes disposed axially of said pair of electrodes and within said non-conducting envelope and an auxiliary pulse electrode disposed within said envelope in spaced relationship to said ionizing electrodes whereby partial ionization of said gas may be produced by application of suitable potentials between said ionizing electrodes while an arc discharge may be initiated in said gas by application of a relatively high potential to said pulse electrode, said pair of electrodes being capacitively coupled to high frequency arcs in said rarefied gases through said non-conducting envelope.

2. A shorting switch for high frequency energy which comprises a cylindrical resonator, first coupling means for introducing high frequency energy into said resonator, second coupling means for extracting energy from said resonator, a pair of axially aligned electrodes extending inwardly from oppositely disposed walls of said resonator and having a spark gap therebetween, a non-conducting envelope containing rarefied gases disposed within said pair of electrodes and extending across said resonator, and ionizing electrodes disposed coaxially of said pair of electrodes and terminating at points remote from said spark gap.

3. A shorting switch for high frequency energy which comprises a cylindrical cavity resonator, coupling means for introducing energy to and extracting energy from said resonator, a pair of hollow electrodes coaxially disposed with respect to said resonator and extending inwardly from opposite walls of said resonator, said electrodes having a spark gap therebetween, a nonconducting envelope containing rarefied gases disposed axially of said hollow electrodes and extending across said resonator, and a pair of coaxial ionizing electrodes disposed within said non-conducting envelope in a region remote from said spark gap and disposed substantially entirely within one of said hollow electrodes, the inner ionizing electrode terminating at a point within the outer ionizing electrode.

4. A shorting switch as in claim 3, said switch further comprising an auxiliary pulse electrode disposed within the other of said hollow electrodes in a region remote from said spark gap and within said non-conducting envelope in spaced relationship to said ionizing electrodes.

5. A transmit-receive radio echo system utilizing a prefired spark gap discharge as a switch to isolate a receiver from a common antenna during periods of transmission and thereby to permit the effective use of one antenna for both transmitting and receiving, comprising modulating means for producing a series of timed trigger pulses, means for generating a pulse of relatively high potential in response to each of said trigger pulses, means for delaying the trigger pulses, a transmitter responsive to said delayed trigger pulses, an antenna, first radio frequency transmission means connecting said transmitter and said antenna, a receiver, second radio frequency transmission means connecting said receiver to a point on said first transmission means, a cavity resonator containing a pair of axially aligned electrodes extending inwardly and forming a spark gap therebetween and a nonconducting tube containing rarefied gases disposed within said pair of electrodes and extending across said resonator, said cavity resonator being connected between said receiver and the junction of said two transmission means, said tube having auxiliary electrodes adapted to be maintained at a continuous potential difference, means for impressing continuously on said auxiliary electrodes a potential difference for causing ionization, said tube also having an auxiliary electrode adapted to be impressed with pulses of high potential for causing a breakdown arc in the neighborhood of the gap at the time of each such pulse, and means connecting said means for generating high potential pulses to said last-mentioned electrode.

6. A system as in claim 5, said system further comprising an indicator synchronized with said delayed trigger pulse and connected to the output of said receiver.

7. In a transmit-receive radio echo system, a spark gap discharge switch having a prefiring electrode, a transmitter, means for generating trigger pulses, means for delaying said trigger pulses, means coupling said undelayed trigger pulses to said prefiring electrode and means coupling said delayed trigger pulses to said transmitter whereby said switch is energized prior to the energization of said transmitter.

8. In a transmit-receive radio echo system having a transmitter, a single antenna, a receiver, first radio frequency transmission means connecting said transmitter and said antenna and second radio frequency transmission line connecting said receiver to said first transmission means, a spark gap discharge switch having a prefiring electrode connected between the receiver and the junction of said two transmission means, means for generating trigger pulses, means for delaying said trigger pulses, means coupling said undelayed pulses to said pre-firing electrode, and means coupling said delayed trigger pulses to said transmitter whereby said switch is energized prior to the energization of said transmitter.

9. A shorting switch as in claim 3, said switch further comprising an auxiliary electrode disposed within the other of said hollow electrodes in a region remote from said spark gap and within said nonconducting envelope, and a pair of metal tubes, each of said tubes being supported concentric within one of said hollow electrodes and forming therewith a radio frequency choke cavity, to isolate said ionizing electrodes and said auxiliary electrode from high frequency energy in said resonator.

10. A pre-firing shorting switch for high frequency energy which comprises a pair of electrodes forming a spark gap therebetween, a nonconducting envelope containing rarefied gases disposed within said pair of electrodes and extending across said resonator, auxiliary ionizing electrodes disposed internally of one of said pair of electrodes within said nonconducting envelope and isolated from said pair of electrodes thereby, means for impressing on said ionizing electrodes a potential difference whereby a condition of ionization is produced in the region of said electrodes, an auxiliary electrode disposed within said envelope in spaced relationship to said ionizing electrodes, and means for impressing periodically on said auxiliary electrode a relatively high potential whereby an intense discharge is produced periodically within said nonconducting envelope in the region of said spark gap, thereby providing a low impedance path for high frequency energy between said spark gap electrodes.

11. In a transmit-receive radio echo system, combination of a resonant cavity having a line of maximum electric field, a pair of open-ended electrodes oppositely positioned at said location of maximum electric field to form a spark gap therebetween, a nonconducting envelope containing rarefied gas inserted adjacent to said electrodes and extending across said resonator, a plurality of ionizing electrodes introduced into said envelope and isolated thereby from said spark gap electrodes, said ionizing electrodes being adapted to be impressed with a constant potential difference, means for producing said potential difference, means for applying said potential difference to said plurality of electrodes, an auxiliary electrode disposed within said envelope in spaced relation to said ionizing electrodes and adapted to be impressed periodically with a pulse of relatively high potential, means for producing said pulse periodically, and means for applying said pulse to said auxiliary electrode, whereby an intense discharge is produced periodically within said nonconducting envelope to provide a low impedance discharge path for high frequency energy between said open-ended electrodes forming said spark gap.

BRUCE B. CORK.

REFERENCES CITED

The following references are of record in the file of this patent:

UNITED STATES PATENTS

| Number | Name | Date |
|---|---|---|
| 1,986,397 | Hund | Jan. 1, 1935 |
| 2,106,770 | Southworth | Feb. 1, 1938 |
| 2,403,303 | Richmond | July 2, 1946 |
| 2,438,873 | McCarthy | Mar. 30, 1948 |
| 2,445,445 | Marcum | July 20, 1948 |
| 2,454,761 | Barrow et al. | Nov. 30, 1948 |
| 2,459,152 | Deisinger et al. | Jan. 18, 1949 |